United States Patent [19]

Murakami et al.

[11] Patent Number: 5,985,974
[45] Date of Patent: Nov. 16, 1999

[54] SLIDE MEMBER FOR PARTS TO BE IN CONTACT WITH MAGNETIC TAPE

[75] Inventors: Tomoyoshi Murakami; Toru Iga; Eiji Tamura; Shigemasa Suzuki, all of Ichihara, Japan

[73] Assignee: Idemitsu Petrochemical Co., Ltd., Japan

[21] Appl. No.: 08/948,412

[22] Filed: Oct. 9, 1997

[30] Foreign Application Priority Data

Oct. 30, 1996 [JP] Japan .................................. 8-287787
Dec. 25, 1996 [JP] Japan .................................. 8-344335

[51] Int. Cl.⁶ ...................................................... C08K 3/34
[52] U.S. Cl. .............................................................. 524/456
[58] Field of Search .............................................. 524/456

[56] References Cited

U.S. PATENT DOCUMENTS 5,741,446  4/1998  Tahara et al. ............................ 264/115

*Primary Examiner*—Peter A. Szekely
*Attorney, Agent, or Firm*—Parkhurst & Wendel, L.L.P

[57] ABSTRACT

Disclosed are slide members for parts to be in contact with magnetic tape, which are made of polyarylenesulfide resin compositions comprising from 20 to 40% by weight of a polyarylenesulfide resin optionally combined with an amorphous, thermoplastic resin, and from 60 to 80% by weight of calcium metasilicate whiskers having a mean fiber diameter of not larger than 5 $\mu$m and a mean aspect ratio of not smaller than 5, optionally combined with an inorganic filler. While being shaped, the resin compositions have good fluidity. The slide members are used in electric and electronic devices as the parts to be in contact with magnetic tape, for example, as VTR cylinders (drums). The slide members have high mechanical strength and good dimensional stability, and have good slidability with magnetic tape.

7 Claims, 2 Drawing Sheets

SLIDE MEMBER FOR PARTS TO BE IN CONTACT WITH MAGNETIC TAPE

FIELD OF THE INVENTION

The present invention relates to a slide member for parts to be in contact with magnetic tape, which is made of a polyarylenesulfide (PAS) resin composition. More precisely, it relates to a slide member for parts to be in contact with magnetic tape, which is made of a PAS resin composition and is characterized in that it has high dimensional stability and good slidability and is favorably used in precision instruments and electronic devices.

BACKGROUND OF THE INVENTION

PAS resins are engineering plastics with good mechanical properties such as heat resistance, flame resistance, stiffness and dimensional stability, and are used in electronic devices and electric devices.

Depending on those applications, however, PAS resins are often required to have additional specific characteristics. For example, when used in cylinder drums in video tape recorders (VTR), they are required to have much higher dimensional stability and good slidability with magnetic tape.

Compositions comprising PAS resins and calcium metasilicate whiskers optionally along with inorganic fillers are known, for example, in Japanese Patent Application Laid-Open Nos. 7-82415, 3-100062 and 59-11359. However, use of those compositions in slide members for parts to be in contact with magnetic tape is unknown.

In order to improve the dimensional stability of PAS resins, it has heretofore been tried to add thereto potassium titanate whiskers, zinc oxide whiskers, aluminium borate whiskers, potassium carbonate whiskers or the like in various technical fields. However, though effective in improving the dimensional stability of the resins in some degree, the addition to the resins of those whiskers is defective in that the whiskers added make the resins thixotropic, often resulting in that the resin compositions containing the whiskers in large quantities are difficult to knead and work. In particular, when the resin compositions are cast into shaped articles, they are often short-shot to give failures. For these reasons, it is inevitable to restrict the amount of the whiskers to be added, and the improvement in the dimensional stability of the resin compositions is naturally limited. In addition, since the resin compositions are hygroscopic, they are still problematic in that the dimensional change in them could not be reduced satisfactorily.

As has been mentioned above, the acceptable amount of the whiskers to be added to the resins is restricted, and the slidability of the resin compositions, which is indispensable when used in members to be in contact with magnetic tape, is poor. Therefore, the conventional, whiskers-containing resin compositions are unsuitable for VTR cylinders (VTR drums).

In order to improve the slidability of drums with magnetic tape, for example, a method has been proposed of adding carbon fibers or carbon beads to the resins for the drums. However, the addition of carbon fibers, especially chopped carbon fibers is defective in that the resultant carbon fibers-containing resin compositions are anisotropic causing the resulting articles made of the compositions lack good roundness, surface smoothness and dimensional stability.

Given that situation, no one has heretofore succeeded in producing good cylinder drums from resins that are substitutable for conventional cylinder drums of aluminium.

SUMMARY OF THE INVENTION

The present invention has been made in consideration of the above-mentioned problems, and its object is to provide slide members made of polyarylenesulfide resin compositions with high fluidity, which have high mechanical strength and good dimensional stability and additionally have good slidability with magnetic tape, and which are therefore favorably used in electric and electronic parts, especially those parts to be in contact with magnetic tape, such as VTR cylinders (VTR drums).

Having assiduously studied, we, the present inventors have found that the object can be attained by slide members made of specific polyarylenesulfide resin compositions. The invention has been completed on the basis of this finding.

Specifically, the invention provides (1) a slide member for parts to be in contact with magnetic tape, which is made of a polyarylenesulfide resin composition comprising from 20 to 40% by weight of a polyarylenesulfide resin (A), and from 60 to 80% by weight of calcium metasilicate whiskers (B) having a mean fiber diameter of not larger than 5 $\mu$m and a mean aspect ratio of not smaller than 5; and provides (2) a slide member for parts to be in contact with magnetic tape, which is made of a polyarylenesulfide resin composition comprising from 20 to 40% by weight of a polyarylenesulfide resin (A), and from 60 to 80% by weight of a combination of (B) and (C), calcium metasilicate whiskers (B) having a mean fiber diameter of not larger than 5 $\mu$m and a mean aspect ratio of not smaller than 5 and an inorganic filler (C) (for example, at least one selected from granular fillers, tabular fillers and milled fibers) with the whiskers (B) being not smaller than 30% by weight.

The invention also provides (3) a slide member for parts to be in contact with magnetic tape, which is made of a polyarylenesulfide resin composition comprising from 20 to 40% by weight of a resin component of (A) plus (A1), a polyarylenesulfide resin (A) and an amorphous, thermoplastic resin (A1), and from 60 to 80% by weight of calcium metasilicate whiskers (B) having a mean fiber diameter of not larger than 5 $\mu$m and a mean aspect ratio of not smaller than 5; and provides (4) a slide member for parts to be in contact with magnetic tape, which is made of a polyarylenesulfide resin composition comprising from 20 to 40% by weight of a resin component of (A) plus (A1), a polyarylenesulfide resin (A) and an amorphous, thermoplastic resin (A1), and from 60 to 80% by weight of a combination of (B) and (C), calcium metasilicate whiskers (B) having a mean fiber diameter of not larger than 5 $\mu$m and a mean aspect ratio of not smaller than 5 and an inorganic filler (C) with the whiskers (B) being not smaller than 15% by weight. Preferably, in the resin component of (A) plus (A1) in (3) and (4), the polyarylenesulfide resin (A) is from 30 to 90% by weight and the amorphous, thermoplastic resin (A1) is from 10 to 70% by weight.

DETAILED DESCRIPTION OF THE INVENTION

Figure 1:
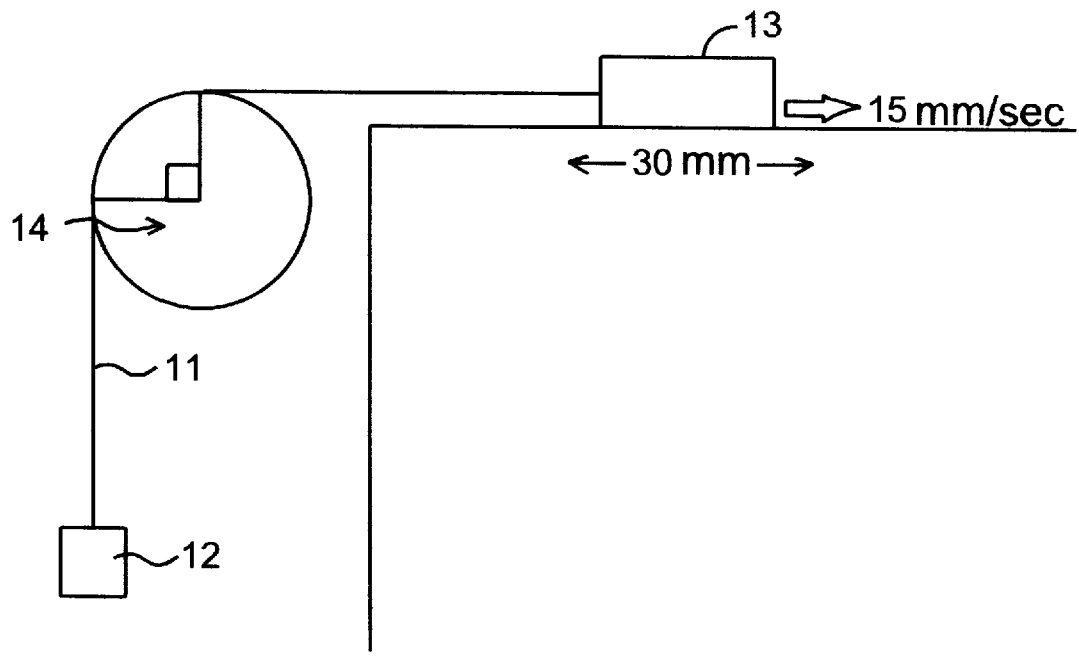
FIG. 1 shows the outline of a shuttle-type slide tester used herein for testing samples.

Concretely described hereinunder are the components constituting the polyarylenesulfide resin compositions of the invention, which are shaped into slide members for parts to be in contact with magnetic tape.

1. Polyarylenesulfide Resin (A):

The polyarylenesulfide (PAS) (A) for use in the invention is a polymer that comprises repeating units of a structural formula, —Ar—S (where Ar is an arylene group), in an amount of not smaller than 70 mol %. Specifically referred to are polyphenylenesulfides which have repeating units of the following structural formula (I) in an amount of not smaller than 70 mol %.

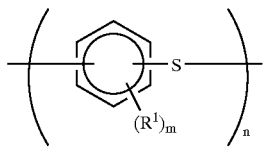

(I)

wherein $R^1$ represents a substituent selected from an alkyl or alkoxy group having 6 or less carbon atoms, a phenyl group, a metal carboxylate residue, an amino group, a nitro group or a halogen atom such as fluorine, chloride or bromine; m represents an integer of from 0 to 4; and n represents a mean degree of polymerization, falling between 1.3 and 30. Preferred are those polyphenylenesulfides having a logarithmic viscosity in an a-chloronaphthalene solution (at a concentration of 0.4 g/dl) at 206° C. of being from 0.1 to 0.5 (dl/g), preferably from 0.13 to 0.4 (dl/g), more preferably from 0.15 to 0.35 (dl/g). Depending on its production, PAS is known to include those polymers having a substantially linear molecular structure with neither branches nor crosslinks, and those polymers having a branched and/or crosslinked molecular structure, any of which are effective in the invention. Preferred PAS for use in the invention is a homopolymer or copolymer having, as the repeating units, paraphenylenesulfide units in any amount of not smaller than 70 mol %, more preferably not smaller than 80 mol % (hereinafter referred to as PPS). If the amount of the repeating paraphenylenesulfide units in PPS is smaller than 70 mol %, such is unfavorable since the degree of crystallinity intrinsic to and characteristic of the crystalline polymer is poor, meaning that the polymer could not exhibit good mechanical properties. The comonomer units to be in PPS include, for example, metaphenylenesulfide units, orthophenylenesulfide units, p,p'-diphenylene-ketone-sulfide units, p,p'-diphenylene-sulfone-sulfide units, p,p'-diphenylenesulfide units, p,p'-diphenylene-ether-sulfide units, p,p'-diphenylene-methylene-sulfide units, p,p'-diphenylene-cumene-sulfide units, and naphthylsulfide units. The polyarylenesulfide for use in the invention further includes, in addition to the substantially linear polymers mentioned above, branched or crosslinked polyarylenesulfides to be prepared by copolymerizing the constitutive monomers with a small amount of comonomers having 3 or more functional groups. Preferred for use in the invention is a combination of those branched or crosslinked polyarylenesulfides and the above-mentioned linear polymers. In addition, PAS for use in the invention as the component (A) still further includes modified polymers to be prepared by modifying linear polymers having a relatively low molecular weight through oxidative crosslinking or thermal crosslinking thereby making the resulting, crosslinked polymers have an increased melt viscosity and improved shapability. The PAS resin for use in the invention can be prepared in any per-se known methods, for example, through ordinary polycondensation of dihalo-aromatic compounds and sulfur sources in organic polar solvents. Preferred examples of the PAS resin are polyphenylenesulfide (PPS) resins of the following structural formula (II):

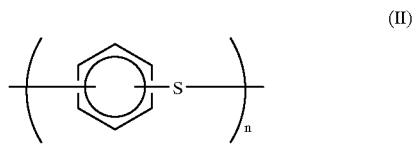

(II)

Regarding its molecular weight, the PAS resin to be in the composition of the invention, which is for slide members for parts to be in contact with magnetic tape, shall have the logarithmic viscosity falling within the defined range, and preferably has a melt viscosity of $50 \leq \eta$ app $\leq 2,000$ (poises). Within the defined range for its viscosity, the PAS resin is desired to have a low molecular weight without having any significant negative influence on the mechanical properties of the slide members made of the resin composition.

The melt viscosity, $\eta$ app, indicates an apparent viscosity of the resin as measured with a capillary viscometer at a resin temperature of 300° C. and at a shear rate of 200 sec$^{-1}$.

2. Amorphous, Thermoplastic Resin (A1):

The amorphous, thermoplastic resin to be used herein may be any and every one that can be one component to be in the composition of the invention, which is for slide members for parts to be in contact with magnetic tape, while being effective in reducing the vertical displacement of the slide member at its surface (lead surface) on which magnetic tape is to run. Concretely, for example, it includes polycarbonate resins, polyether-imide resins, poly-aromatic ether resins, and polysulfone resins. Those resins having a lower degree of crystallinity give shaped articles with lower volume shrinkage at Tmc. Tmc is a melt crystallization temperature, at which the melt of the resin is crystallized. Therefore, amorphous resins are preferably used in the invention.

As the polycarbonate resins, preferably used are 4,4'-dihydroxy-diarylalkane polycarbonates, more preferably bisphenol A polycarbonates. Also preferred are modified bisphenol A polycarbonates and flame-retardant bisphenol A polycarbonates.

The poly-aromatic ether resins include, for example, polyphenylene ethers, styrene-grafted polyphenylene ethers, and polyether nitriles.

The polysulfone resins include, for example, polysulfones, polyether sulfones, polyarylsulfones.

In the invention, one more of those amorphous or, thermoplastic resins may be used either singly or as combined.

3. Calcium Metasilicate Whiskers (B):

As the calcium metasilicate whiskers (B) for use in the invention, mentioned are white needle-like minerals of CaSiO$_3$, such as wollastonite.

The calcium metasilicate whiskers (B) must have a mean fiber diameter of not larger than 5 $\mu$m, preferably not larger than 3 $\mu$m. If their mean fiber diameter is larger than 5 $\mu$m, the stiffness of the shaped articles comprising the whiskers, especially the stiffness thereof around their surfaces is poor, resulting in that the slidability of the shaped articles with tapes is poor. In addition, the calcium metasilicate whiskers (B) must have a mean aspect ratio of not smaller than 5, preferably not smaller than 10. If their mean aspect ratio is smaller than 5, the slidability of the shaped articles with tapes is poor for the same reason as above.

4. Inorganic Filler (C):

The inorganic filler for use in the invention is not specifically defined, but is preferably selected from granular fillers, tabular fillers and milled fibers.

The granular fillers are amorphous or spherical, and have a mean aspect ratio of about 2 or smaller. For those, concretely mentioned are calcium carbonate, silica, glass beads, fired carbon, alumina, aluminium borate, and carbon black.

The tabular fillers are those of which the thickness is smaller than the length and the width. For those, concretely mentioned are mica, graphite, kaolin, talc, and glass flakes.

The milled fibers are prepared by milling fibers or by milling and classifying block minerals. For those, concretely mentioned are wollastonite minerals (except those for the component (B), milled carbon fibers, and milled glass fibers.

The calcium metasilicate whiskers (B) and the inorganic filler (C) may be surface-treated, for example, with a coupling agent, which is preferably selected from aminosilanes, vinylsilanes, phenylsilanes and epoxysilanes, or with any other silane coupling agent. The surface treatment of these components is recommended. If those not surface-treated are used, the mechanical strength of the shaped articles is poor while the degree of their moisture-absorption is large, often resulting in that the moisture-resistant, dimensional stability of the shaped articles is poor.

5. Compositional Proportions of Constituent Components:

(1) For slide member (1) for parts to be in contact with magnetic tape:

The composition for the slide member (1) comprises from 20 to 40% by weight, preferably from 25 to 35% by weight, of the PAS resin (A), and from 60 to 80% by weight, preferably from 65 to 75% by weight, of the calcium metasilicate whiskers (B). If the amount of the PAS resin (A) is smaller than 20% by weight, the composition is difficult to knead. Even if kneaded, the composition gives brittle articles. On the other hand, if the amount of the PAS resin is larger than 40% by weight, the shaped articles will have poor dimensional stability and poor slidability.

(2) For slide member (2) for parts to be in contact with magnetic tape:

The amount of the PAS resin (A) to be in the composition for the slide member (2) is the same as that to be in the slide member (1). Therefore, the total of the calcium metasilicate whiskers (B) and the inorganic filler (C) shall be from 60 to 80% by weight, preferably from 65 to 75% by weight. In this composition, the amount of the calcium metasilicate whiskers (B) must be 30% by weight or larger, preferably 40% by weight or larger. If it is smaller than 30% by weight, the slidability of the shaped articles is poor.

(3) For slide member (3) for parts to be in contact with magnetic tape:

First described is the resin component (A+A1) comprised of the PAS resin (A) and the amorphous, thermoplastic resin (A1).

Relative to the total weight of the resin component, it is preferable that the PAS resin (A) accounts for from 30 to 90% by weight while the amorphous, thermoplastic resin (A1) for from 10 to 70% by weight. If the PAS resin (A) is smaller than 30% by weight, the surface of the shaped article shall be substantially of the amorphous, thermoplastic resin only to have an enlarged friction factor, resulting in that the shaped article could not have the intended characteristics. If, on the other hand, the amorphous, thermoplastic resin (A1) is smaller than 10% by weight, the vertical displacement of the lead part of the VTR cylinder made of the composition—magnetic tape is to run on the lead part—will be enlarged.

Relative to the resin component (A+A1) of being from 20 to 40% by weight, preferably from 25 to 35% by weight, the calcium metasilicate whiskers (B) are to be from 60 to 80% by weight, preferably from 65 to 75% by weight. If the resin component is smaller than 20% by weight, the composition is difficult to knead. Even if kneaded, the composition gives brittle articles. On the other hand, if the resin component is larger than 40% by weight, the shaped articles will have poor dimensional stability and poor slidability.

(4) For slide member (4) for parts to be in contact with magnetic tape:

The amount of the resin component (A+A1) to be in the composition for the slide member (4) is the same as that to be in the slide member (3). Therefore, the total of the calcium metasilicate whiskers (B) and the inorganic filler (C) shall be from 60 to 80% by weight, preferably from 65 to 75% by weight. In this composition, the amount of the calcium metasilicate whiskers (B) must be 30% by weight or larger, preferably 40% by weight or larger. If it is smaller than 30% by weight, the slidability of the shaped articles is poor.

6. Other Components:

The polyarylenesulfide resin composition of the invention for the slide members for parts to be in contact with magnetic tape may contain any other additional components, in addition to the constituent components mentioned above, within the range not interfering with the object of the invention. The additional components include, for example, various additives such as antioxidants, thermal stabilizers, lubricants, colorants, plasticizers, and electroconductive agents; thermoplastic resins and/or thermosetting resins such as silicone resins, silicone oils, silicone oils with various functional groups, and polyolefins; rubbers such as hydrogenated styrene-buta diene-styrene block copolymer (SBS), hydrogenate acrylonitrile-buta diene rubber (NBR) silicone rubbers, and fluorine rubbers; and pigments. The amount of those additional components to be in the composition may be suitably determined within the range not interfering with the object of the invention.

7. Preparation of Polyarylenesulfide Resin Composition:

The polyarylenesulfide resin composition of the invention for the slide members for parts to be in contact with magnetic tape can be prepared by mixing the resin component (the PAS resin (A) optionally combined with the amorphous, thermoplastic resin (A1)) and the calcium metasilicate whiskers (B) optionally combined with the inorganic filler (C), and further optionally along with additional components, for example, by melting and kneading them.

To melt and knead them, employable are any known methods in which the components except the resin are uniformly dispersed in the resin and mixed to give the intended resin composition.

For example, double-screw extruders and single-screw extruders are preferably used to knead the melts.

The condition for melting and kneading the components is not specifically defined. However, too high temperatures and too long residence time are not desirable. Concretely, the components are kneaded at a temperature falling between 280 and 350° C., preferably between 285 and 330° C.

The polyarylenesulfide resin composition thus prepared in the manner mentioned above is generally granulated or chopped into pellets or the like having any desired shape and size for secondary working, especially those for injection molding.

8. Slide Member for Parts to be in Contact with Magnetic Tape, which is made of the PAS resin composition:

The shaped articles of the invention, which are made of the PAS resin composition, have high mechanical strength and good dimensional stability and have good slidability with magnetic tape. Therefore, these are favorably used in various electric and electronic devices as slide members for parts to be in contact with magnetic tape, for example, as VTR cylinders (VTR drums), and tape guides especially those in audio and video tape recorders.

The following Examples are to concretely demonstrate the slide members of the invention, which are made of the polyarylenesulfide resin compositions and are for parts to be in contact with magnetic tape, but these Examples are not to restrict the scope of the invention.

Examples 1 to 18, Comparative Examples 1 to 10:

Examples 1 to 10 are to demonstrate the slide members (1) and (2) of the invention, which are compared with Comparative Examples 1 to 6; and Examples 11 to 18 are to demonstrate the slide members (3) and (4) of the invention, which are compared with Comparative Examples 7 to 10.

Preparation of Samples:

Using a double-screw extruder (TEM 35, manufactured by Toshiba Machine Co.), a polyphenylenesulfide resin (PPS resin) mentioned below was uniformly mixed with the components shown in Table 1 in the ratio shown therein, in a Henschel mixer, then melt-kneaded and pelletized at a temperature falling between 300 and 350° C. to give resin pellets.

Preparation of Component (A), PPS:

833 mols of sodium sulfide hydrate ($Na_2S.5H_2O$), 830 mols of lithium chloride (LiCl) and 500 liters of N-methyl-2-pyrrolidone (NMP) were put into a polymerization tank equipped with a stirrer, and dewatered under reduced pressure at 145° C. for 1 hour. Next, the reaction system was cooled to 45° C., and 905 mols of dichlorobenzene (DCB) was added thereto, and polymerized at 260° C. for 3 hours. The reaction mixture was washed five times with hot water, then once with N-methyl-2-pyrrolidone (NMP) at 170° C., and then three times with water, and thereafter dried at 185° C. to obtain PPS.

Other Components Added to PPS Resin:

1) Component (A1):

Polycarbonate: Idemitsu Toughlon A-1900 (trade name, manufactured by Idemitsu Petrochemical Co.)

Polyether Imide: Ultem 1000 (trade name, manufactured by Nippon GE Plastics Co.)

Polysulfone: Udel P-1700 (trade name, manufactured by Teijin Amoco Engineering Plastics Co.)

Modified Polyphenylene Ether: Nonyl (trade name, manufactured by Nippon GE Plastics Co.)

2) Component (B):

Wollastonite whiskers 1: calcium metasilicate whiskers, NYGLOS (trade name, manufactured by NYCO Co. in U.S.), having a mean fiber diameter of not larger than 5 μm and a mean aspect ratio of not smaller than 10.

3) Component (C):

Wollastonite whiskers 2: calcium metasilicate whiskers, NYAD G (trade name, manufactured by NYCO Co. in U.S.), having a mean fiber diameter of larger than 5 μm and a mean aspect ratio of 12.

Milled carbon fibers: M101T (trade name, manufactured by Kureha Chemical Co.)

Chopped carbon fibers: Besfite HTA-C6-SRS (trade name, manufactured by Toyo Rayon Co.)

Mica: 200D (trade name, manufactured by Kuraray Co.)

Silica: FB-74 (trade name, manufactured by Nitto Denko Co.)

Alumina: AS40 (trade name, manufactured by Showa Denko Co.)

Calcium carbonate: Whiton P30 (trade name, manufactured by Shiraishi Industrial Co.)

Ketzen black: EC-600JD (trade name, manufactured by Lion Co.)

Potassium titanate whiskers: Tismo-D (trade name, manufactured by Ohtsuka Chemical Co.)

Evaluation of Physical Properties:

Degree of roundness:

Using an injection-molding machine (J50E-P, manufactured by Japan Steel Works Co.), a sample of the PPS composition was molded into a lower cylinder (drum) for VTR, having a diameter of 62 mm and a height of 15 mm. After having been kept at room temperature for 24 hours, the degree of roundness of the cylinder sample was measured using a roundness measuring machine (RA-2, manufactured by Mitsutoyo Seisaku-sho Co.). As for the condition for molding the sample, the resin temperature was 340° C., and the mold temperature was 135° C.

Figure 2:
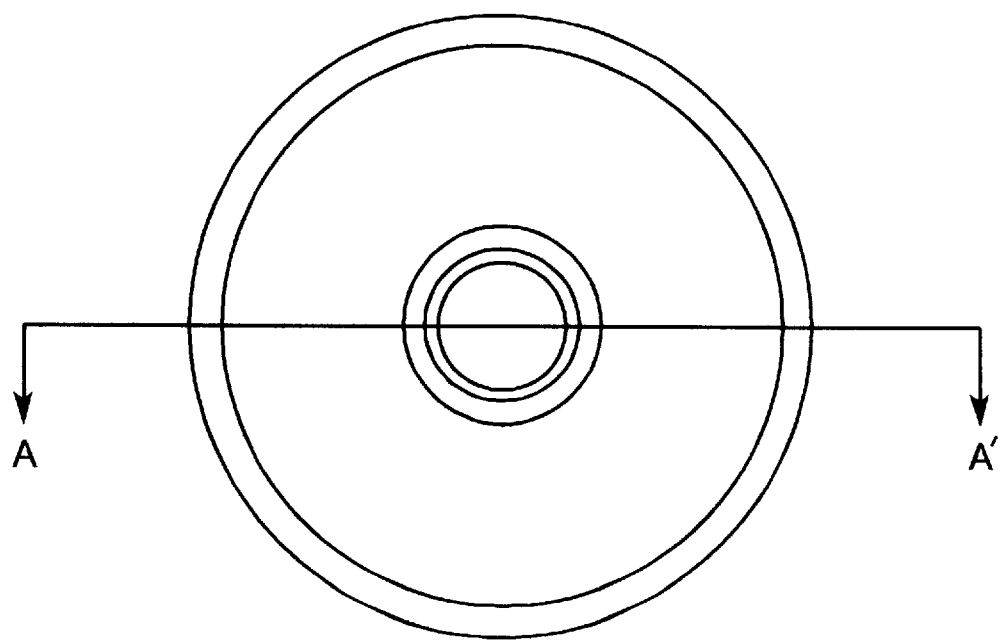
FIG. 2 is a plan view of a sample piece to be tested for its vertical displacement.
Figure 3:
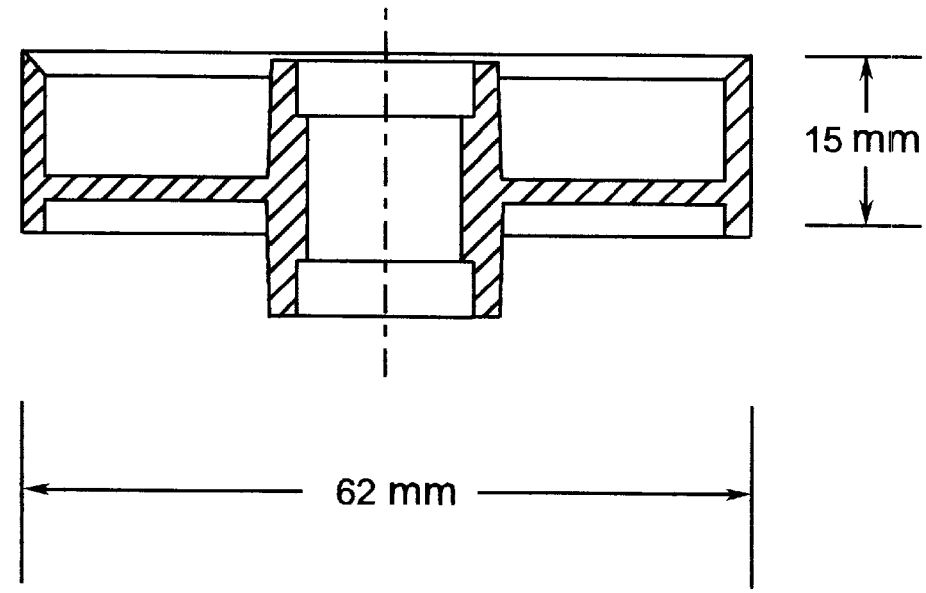
FIG. 3 is a cross-sectional view of the sample piece as cut along the line A–A' of FIG. 2.
Figure 4:
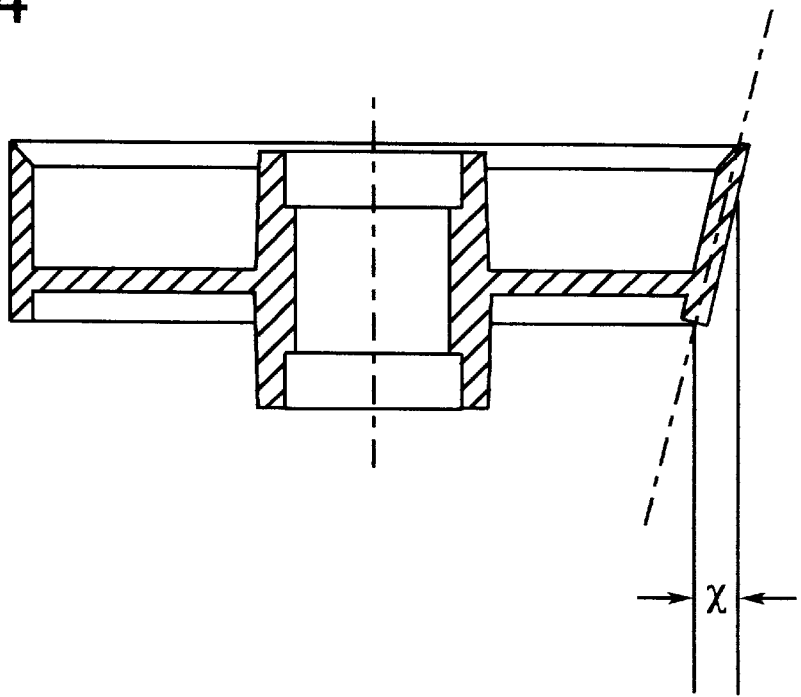
FIG. 4 is a cross-sectional view of the sample piece as cut along the line A–A' of FIG. 2, in which "x" indicates the vertical displacement of the sample piece.

Degree of vertical displacement:

As in FIG. 2 and FIG. 3 showing the cylinder (drum) sample, when the outer surface of its peripheral wall is parallel to the center axis, the degree of vertical displacement of the peripheral wall is 0 (zero). As in FIG. 4, when the outer surface of the peripheral wall of the sample is not parallel to the center axis while being vertically displaced, the degree of vertical displacement of the peripheral wall is "x".

Slidability with magnetic tape:

Using a shuttle-type slide tester shown in FIG. 1, the friction factor of the cylinder (drum) sample relative to magnetic tape was measured. The magnetic tape used herein was Sony's videotape, Hi8ME120, and its magnetic surface was pressed against the cylinder sample.

Referring to the illustration of FIG. 1, the measurement was effected in the following manner. The video tape 11 was cut to have a length of about 60 cm, and a load 12 of 20 g was applied to its one end while the other end was connected with a tension meter 13, as in FIG. 1. In that condition, the tape 11 was slid back and forth on the cylinder sample 14 for a total of 100 times, while being pressed against the cylinder sample 14, at a speed of 15 mm/sec for a distance of 30 mm. After this, the tape 11 was drawn up while applying a tension of $T_1$ to its one end, whereupon the tension of the tape 11, $T_2$, was measured. From those $T_1$ and $T_2$, the friction factor, μ, of the cylinder sample 14 relative to the tape 11 was obtained according to the following equation.

$$\mu = (2/\pi) \cdot \ln(T_2/T_1)$$

Bending strength, modulus of bending elasticity: Using the injection-molding machine (J50E-P, manufactured by Japan Steel Works Co.), a sample of the PPS composition was molded into a test piece, at a resin temperature of 320° C. and at a mold temperature of 135° C. The bending strength and the modulus of bending elasticity of the test piece were measured according to ASTM D790.

Test Data:

The test data obtained are shown in Table 1, in which the amount of the constituent component is % by weight.

TABLE 1-1

|  |  | Example 1 | Example 2 | Example 3 | Example 4 | Example 5 |
|---|---|---|---|---|---|---|
| (A) | PAS | 24 | 32 | 36 | 28 | 32 |
| (B) | Wollastonite Whiskers 1 | 76 | 68 | 64 | 40 | 41 |
| (C) | Wollastonite Whiskers 2 | 0 | 0 | 0 | 32 | 26 |
|  | Milled Carbon Fibers | 0 | 0 | 0 | 0 | 0 |
|  | Mica | 0 | 0 | 0 | 0 | 0 |
|  | Silica | 0 | 0 | 0 | 0 | 0 |
|  | Alumina | 0 | 0 | 0 | 0 | 0 |
|  | Calcium Carbonate | 0 | 0 | 0 | 0 | 0 |
|  | Ketzen Black | 0 | 0 | 0 | 0 | 1 |
|  | Potassium Titanate Whiskers | 0 | 0 | 0 | 0 | 0 |
| Degree of Roundness ($\mu$m) | | 10 | 12 | 16 | 9 | 12 |
| Friction Factor relative to magnetic tape | | 0.14 | 0.17 | 0.18 | 0.19 | 0.20 |
| Flexural Strength (MPa) | | 130 | 165 | 180 | 131 | 183 |
| Flexural Modulus (GPa) | | 32.4 | 26.2 | 24.0 | 25.0 | 20.9 |

TABLE 1-2

|  |  | Example 6 | Example 7 | Example 8 | Example 9 | Example 10 |
|---|---|---|---|---|---|---|
| (A) | PAS | 29 | 34 | 29 | 29 | 34 |
| (B) | Wollastonite Whiskers 1 | 51 | 35 | 54 | 31 | 44 |
| (C) | Wollastonite Whiskeys 2 | 0 | 0 | 0 | 0 | 9 |
|  | Milled Carbon Fibers | 20 | 0 | 0 | 0 | 9 |
|  | Mica | 0 | 30 | 0 | 0 | 0 |
|  | Silica | 0 | 0 | 16 | 0 | 0 |
|  | Alumina | 0 | 0 | 0 | 39 | 0 |
|  | Calcium Carbonate | 0 | 0 | 0 | 0 | 13 |
|  | Ketzen Black | 0 | 1 | 1 | 1 | 0 |
|  | Potassium Titanate Whiskers | 0 | 0 | 0 | 0 | 0 |
| Degree of Roundness ($\mu$m) | | 7 | 11 | 9 | 12 | 8 |
| Friction Factor relative to magnetic tape | | 0.18 | 0.21 | 0.17 | 0.16 | 0.19 |
| Flexural Strength (MPa) | | 148 | 133 | 139 | 163 | 133 |
| Flexural Modulus (GPa) | | 29.8 | 19.9 | 19.2 | 20.3 | 22.7 |

TABLE 1-3

|  |  | Comparative Example 1 | Comparative Example 2 | Comparative Example 3 | Comparative Example 4 | Comparative Example 5 | Comparative Example 6 |
|---|---|---|---|---|---|---|---|
| (A) | PAS | 19 | 41 | 32 | 43 | 33 | 32 |
| (B) | Wollastonite Whiskers 1 | 81 | 59 | 0 | 0 | 0 | 21 |
| (C) | Wollastonite Whiskers 2 | 0 | 0 | 68 | 0 | 0 | 46 |
|  | Milled Carbon Fibers | 0 | 0 | 0 | 0 | 0 | 0 |
|  | Mica | 0 | 0 | 0 | 0 | 0 | 0 |
|  | Silica | 0 | 0 | 0 | 0 | 0 | 0 |
|  | Alumina | 0 | 0 | 0 | 0 | 0 | 0 |
|  | Calcium Carbonate | 0 | 0 | 0 | 0 | 0 | 0 |
|  | Ketzen Black | 0 | 0 | 0 | 0 | 0 | 1 |
|  | Potassium Titanate Whiskers | 0 | 0 | 0 | 57 | 67 | 0 |
| Degree of Roundness ($\mu$m) | | Unkneadble | 28 | 32 | 29 | Unkneadable | 20 |
| Friction Factor relative to magnetic tape | |  | 0.31 | 0.30 | 0.50 |  | 0.32 |
| Flexural Strength (MPa) | |  | 211 | 137 | 122 |  | 146 |
| Flexural Modulus (GPa) | |  | 21.6 | 22.2 | 19.0 |  | 24.6 |

TABLE 1-4

|  |  | Example 11 | Example 12 | Example 13 | Example 14 | Example 15 | Example 16 | Example 17 | Example 18 |
|---|---|---|---|---|---|---|---|---|---|
| (A) | PAS | 25 | 16 | 20 | 29 | 24 | 24 | 24 | 24 |
| (A1) | Polycarbonate | 7 | 16 | 8 | 5 | 0 | 0 | 0 | 0 |
|  | Polyetherimide | 0 | 0 | 0 | 0 | 8 | 0 | 0 | 0 |
|  | Polysulfone | 0 | 0 | 0 | 0 | 0 | 8 | 10 | 0 |
|  | Polyphenylene ether | 0 | 0 | 0 | 0 | 0 | 0 | 0 | 8 |
| (B) | Wollastonite Whiskers 1 | 68 | 68 | 40 | 35 | 68 | 68 | 58 | 68 |
| (C) | Wollastonite Whiskers 2 | 0 | 0 | 32 | 0 | 0 | 0 | 0 | 0 |

TABLE 1-4-continued

|  | Example 11 | Example 12 | Example 13 | Example 14 | Example 15 | Example 16 | Example 17 | Example 18 |
|---|---|---|---|---|---|---|---|---|
| Milled Carbon Fibers | 0 | 0 | 0 | 0 | 0 | 0 | 8 | 0 |
| Mica | 0 | 0 | 0 | 30 | 0 | 0 | 0 | 0 |
| Ketzen Black | 0 | 0 | 0 | 1 | 0 | 0 | 0 | 0 |
| Degree of Roundness ($\mu$m) | 9 | 8 | 8 | 11 | 8 | 9 | 11 | 11 |
| Friction Factor relative to magnetic tape | 0.18 | 0.20 | 0.16 | 0.22 | 0.16 | 0.20 | 0.17 | 0.18 |
| Vertical Displacement of Lead Part ($\mu$m) | 14 | 10 | 12 | 18 | 15 | 17 | 17 | 16 |

TABLE 1-5

|  |  | Comparative Example 7 | Comparative Example 8 | Comparative Example 9 | Comparative Example 10 |
|---|---|---|---|---|---|
| (A) PAS |  | 32 | 34 | 20 | 10 |
| (A1) | Polycarbonate | 0 | 0 | 12 | 0 |
|  | Polyetherimide | 0 | 0 | 0 | 30 |
|  | Polysulfone | 0 | 0 | 0 | 0 |
| (B) Wollastonite Whiskers 1 |  | 68 | 35 | 0 | 60 |
| (C) | Wollastonite Whiskers 2 | 0 | 0 | 68 | 0 |
|  | Milled Carbon Fibers | 0 | 0 | 0 | 0 |
|  | Mica | 0 | 30 | 0 | 0 |
|  | Ketzen Black | 0 | 1 | 0 | 0 |
| Degree of Roundness ($\mu$m) |  | 12 | 11 | 10 | 9 |
| Friction Factor relative to magnetic tape |  | 0.17 | 0.21 | 0.34 | 0.44 |
| Vertical Displacement of Lead Part ($\mu$m) |  | 45 | 46 | 14 | 13 |

The data obtained in those Examples and Comparative Examples verify the following:

In Comparative Example 1, the components could not be kneaded since the amount of PAS was too small.

In Comparative Example 2, the dimension stability of the sample was poor and the friction factor thereof was large, since the amount of the calcium metasilicate whiskers was too small.

In Comparative Example 3, the friction factor of the sample was large and the stiffness thereof was low, since both the mean fiber diameter and the mean aspect ratio of the calcium metasilicate whiskers used were outside the defined ranges.

In Comparative Example 4, the friction factor of the sample was large since the whiskers used were not calcium metasilicate whiskers.

In Comparative Example 5 in which the whiskers used were not calcium metasilicate whiskers and their amount was large, the components could not be kneaded.

In Comparative Example 6, the dimension stability of the sample was poor and the friction factor thereof was large, since the amount of the calcium metasilicate whiskers was too small.

In Comparative Example 7, the vertical displacement of the lead part of the sample was large since the resin component was PAS only.

In Comparative Example 8, the vertical displacement of the lead part of the sample was large since the resin component was PAS only.

In Comparative Example 9, the friction factor of the sample was large since the calcium metasilicate whiskers used had a mean fiber diameter of larger than 5 $\mu$m.

In Comparative Example 10, the friction factor of the sample was large since the amorphous, thermoplastic resin in the resin component was larger than 70% by weight.

As has been mentioned hereinabove with reference to its embodiments, the invention provides slide members made of polyarylenesulfide resin compositions, which are used in electric and electronic devices as the parts to be in contact with magnetic tape, for example, as VTR cylinders (drums). While being shaped, the polyarylenesulfide resin compositions of the invention have good fluidity. The slide members of the invention have high mechanical strength and good dimensional stability, and have good slidability with magnetic tape. In addition, the vertical displacement of the lead part of the slide member, on which magnetic tape runs, is small.

While the invention has been described in detail and with reference to specific embodiments thereof, it will be apparent to one skilled in the art that various changes and modifications can be made therein without departing from the spirit and scope thereof.

What is claimed is:

1. A slide member for parts to be in contact with magnetic tape, which is made of a polyarylenesulfide resin composition comprising from 20 to 40% by weight of a polyarylenesulfide resin (A), and from 60 to 80% by weight of calcium metasilicate whiskers (B) having a mean fiber diameter of not larger than 5 $\mu$m and a mean aspect ratio of not smaller than 5.

2. A slide member for parts to be in contact with magnetic tape, which is made of a polyarylenesulfide resin composition comprising from 20 to 40% by weight of a polyarylenesulfide resin (A), and from 60 to 80% by weight of a combination of (B) and (C), calcium metasilicate whiskers (B) having a mean fiber diameter of not larger than 5 μm and a mean aspect ratio of not smaller than 5 and an inorganic filler (C), with the whiskers (B) being not smaller than 30% by weight.

3. A slide member for parts to be in contact with magnetic tape, which is made of a polyarylenesulfide resin composition comprising from 20 to 40% by weight of a resin component of (A) plus (A1), a polyarylenesulfide resin (A) and an amorphous, thermoplastic resin (A1), and from 60 to 80% by weight of calcium metasilicate whiskers (B) having a mean fiber diameter of not larger than 5 μm and a mean aspect ratio of not smaller than 5.

4. A slide member for parts to be in contact with magnetic tape, which is made of a polyarylenesulfide resin composition comprising from 20 to 40% by weight of a resin component of (A) plus (A1), a polyarylenesulfide resin (A) and an amorphous, thermoplastic resin (A1), and from 60 to 80% by weight of a combination of (B) and (C), calcium metasilicate whiskers (B) having a mean fiber diameter of not larger than 5 μm and a mean aspect ratio of not smaller than 5 and an inorganic filler (C), with the whiskers (B) being not smaller than 15% by weight.

5. The slide member for parts to be in contact with magnetic tape as claimed in claim 3, in which the polyarylenesulfide resin (A) is from 30 to 90% by weight and the amorphous, thermoplastic resin (A1) is from 10 to 70% by weight, relative to the total weight of the resin component of (A) plus (A1) of being 100% by weight.

6. The slide member for parts to be in contact with magnetic tape as claimed in claim 3, in which the amorphous, thermoplastic resin (A1) is at least one selected from the group consisting of polycarbonate resins, polyether imide resins, poly-aromatic ether resins and polysulfone resins.

7. The slide member for parts to be in contact with magnetic tape as claimed in claim 2, in which the inorganic filler (C) is at least one selected from the group consisting of granular fillers, tabular fillers and milled fibers.

* * * * *

UNITED STATES PATENT AND TRADEMARK OFFICE
CERTIFICATE OF CORRECTION

PATENT NO.    : 5,985,974
DATED         : November 16, 1999
INVENTOR(S)   : Tomoyoshi Murakami et al.

It is certified that error appears in the above-identified patent and that said Letters Patent is hereby corrected as shown below:

<u>Column 3,</u>
Line 37, change "in any amount of" to -- in an amount of --.

<u>Column 9,</u>
Table 1-2, change "(C) Wollanstonite Whiskeys 2" to -- (C) Wollastonite Whiskers 2 --; and the entry in that line for "Example 10" from "9" to -- 0 --.

Signed and Sealed this

Eleventh Day of November, 2003

JAMES E. ROGAN
*Director of the United States Patent and Trademark Office*